(12) United States Patent
Papasakellariou et al.

(10) Patent No.: US 9,553,648 B2
(45) Date of Patent: *Jan. 24, 2017

(54) REPORTING OF MULTIPLE PROCESSES FOR APERIODIC CHANNEL STATE INFORMATION

(71) Applicant: Samsung Electronics Co., Ltd., Suwon-si, Gyeonggi-do (KR)

(72) Inventors: Aris Papasakellariou, Houston, TX (US); Joon-Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,326

(22) Filed: Apr. 28, 2015

(65) Prior Publication Data
US 2015/0244443 A1 Aug. 27, 2015

Related U.S. Application Data

(63) Continuation of application No. 13/751,830, filed on Jan. 28, 2013, now Pat. No. 9,019,856.

(51) Int. Cl.
*H04B 7/06* (2006.01)
*H04W 72/04* (2009.01)
(Continued)

(52) U.S. Cl.
CPC ........... *H04B 7/0626* (2013.01); *H04L 1/0026* (2013.01); *H04L 1/0027* (2013.01);
(Continued)

(58) Field of Classification Search
CPC ... H04B 7/0621; H04B 7/0626; H04B 7/0632; H04L 1/0026; H04L 1/0027; H04L 1/0028; H04L 1/06; H04L 5/00; H04L 5/001; H04L 5/0057; H04L 5/0094; H04L 12/2697; H04L 43/00; H04L 43/0852; H04L 43/50; H04L 47/10; H04W 24/10; H04W 72/0413; H04W 72/042

See application file for complete search history.

(56) References Cited

U.S. PATENT DOCUMENTS

2012/0076017 A1* 3/2012 Luo ................. H04L 1/0027
370/252
2012/0250541 A1 10/2012 Ko et al.

FOREIGN PATENT DOCUMENTS

| EP | 2 587 876 A1 | 5/2013 |
| WO | 2010/024556 A2 | 3/2010 |
| WO | 2011/127092 A1 | 10/2011 |

OTHER PUBLICATIONS

Yue Rong et al., On Average One Bit Per Subcarrier Channel State Information Feedback in OFDM Wireless Communication Systems p. 4011, 2004 IEEE.
(Continued)

*Primary Examiner* — Khoa Huynh
(74) *Attorney, Agent, or Firm* — Jefferson IP Law, LLP (57) ABSTRACT

A method and an apparatus are provided for transmitting Channel State Information (CSI) having a reporting mode and being transmitted from a User Equipment (UE) over a PUSCH transmission in an Uplink (UL) cell associated with a Downlink (DL) cell in response to the UE receiving a Downlink Control Information (DCI) format that includes a CSI request field indicating CSI transmission corresponding to one of a plurality of CSI processes associated with measurements of respective reference signals. The method includes obtaining, from the CSI request field, an indication of a CSI process set for a CSI transmission; and transmitting the CSI for the CSI process set indicated by the CSI request
(Continued)

CSI PROCESS SET 1 FOR APERIODIC CSI REPORTING MODES {MODE 1, MODE 2, MODE 3, MODE 4} ~410
CSI PROCESS SET 2 FOR APERIODIC CSI REPORTING MODES: {MODE A, MODE B, MODE C, MODE D} ~420

NodeB TRANSMITS AND UE RECEIVES FIRST HIGHER LAYER SIGNALING CONFIGURING FIRST APERIODIC CSI MODE FOR CSI PROCESS SET 1 ~430

NodeB TRANSMITS AND UE RECEIVES SECOND HIGHER LAYER SIGNALING CONFIGURING SECOND APERIODIC CSI MODE FOR CSI PROCESS SET 2 ~440 field, wherein the CSI request field includes 2 bits of a first CSI process set having a first set of interpretations.

18 Claims, 5 Drawing Sheets

Related U.S. Application Data (60) Provisional application No. 61/591,546, filed on Jan. 27, 2012.

(51) Int. Cl.
  *H04L 1/00* (2006.01)
  *H04L 1/06* (2006.01)
  *H04L 5/00* (2006.01)

(52) U.S. Cl.
  CPC .............. *H04L 1/0028* (2013.01); *H04L 1/06* (2013.01); *H04W 72/042* (2013.01); *H04W 72/0413* (2013.01); *H04L 5/001* (2013.01); *H04L 5/0057* (2013.01); *H04L 5/0094* (2013.01)

(56) References Cited

OTHER PUBLICATIONS

LG Electronics, Details of CSI Reporting in Time-Domain EICIC, 3GPP Draft, R1-110891, Feb. 15, 2011, vol. RAN WGl,Section 4,pp. 3-4, Taipei, Taiwan.
Fujitsu, Consideration on CSI Feedback to Support DL Comp, 3GPP DRAGT, R1-114180 Nov. 9, 2011, vol. RAN WG1,p. 2, San Francisco, USA.
Huawei et al. "CSI Feedback Modes for CoMP," 3GPP TSG RAN WGI Meeting #69, May 21-25, 2012, R1-121946, Prague, Czech Republic.
Fujitsu, "Email Discussion [69-11]: FFS Aspects of Aperiodic CSI Feedback for CoMP," 3GPP TSG RAN WG1 Meeting #70bis, Oct. 8-12, 2012, R1-124125, San Diego, USA.
NTT Docomo, "Details of Aperiodic CSI Feedback for Rei-11 CoMP," 3GPP TSG RAN WG1 Meeting #70bis, Oct. 8-12, 2012, R1-124250, San Diego, USA.
Pantech, "CSI Request Filed of Aperiodic Feedback for DL CoMP," 3GPP TSG RAN1 #70bis, Oct. 8-12, 2012, R1-124305, San Diego, USA.
Alcatel-Lucent et al., "DCI-Based Triggering for Aperiodic CSI Feedback for CoMP," 3GPP TSG RAN WG1 Meeting #70bis, Oct. 8-12, 2012, R1-124410, San Diego, USA.

* cited by examiner

REPORTING OF MULTIPLE PROCESSES FOR APERIODIC CHANNEL STATE INFORMATION

CROSS-REFERENCE TO RELATED APPLICATION(S)

This application is a continuation application of a prior application Ser. No. 13/751,830, filed on Jan. 28, 2013, which issued as U.S. Pat. No. 9,019,856 on Apr. 28, 2015, and which claimed the benefit under 35 U.S.C. §119(e) of a U.S. Provisional application filed on Jan. 27, 2012 in the U.S. Patent and Trademark Office and assigned Ser. No. 61/591,546, the entire disclosure of which is hereby incorporated by reference.

BACKGROUND OF THE INVENTION

1. Field of the Invention

The present invention is directed to wireless communication systems and, more specifically, to providing channel state information feedback in wireless communication systems.

2. Description of the Art

A communication system may include transmitting and/or receiving DownLink (DL) signals, which are signals transmitted from Base Stations (BSs), such as NodeBs, to User Equipments (UEs), and UpLink (UL) signals, which are signals from transmitted from UEs to NodeBs. A UE, which may be a terminal, a mobile station, a Personal Computer (PC), or any other similar and/or suitable electronic device, may be fixed or mobile and may be a wireless device. A NodeB may be a fixed station and may also be referred to as a Base Transceiver System (BTS), an access point, or any other similar and/or suitable device name for describing a device receiving UL signals from a UE.

A NodeB transmits data information to a UE using a Physical DL Shared CHannel (PDSCH) and transmits DL Control Information (DCI) to a UE using a Physical DL Control CHannel (PDCCH). A UE transmits data information to a NodeB using a Physical UL Shared CHannel (PUSCH) and transmits UL Control Information (UCI) to a NodeB using a Physical UL Control CHannel (PUCCH). If a UE transmits data information and UCI at a same Transmission Time Interval (TTI), the UE may multiplex UCI with data information in a PUSCH so as to not transmit UCI in a PUCCH.

UCI may include Channel State Information (CSI), which may include Channel Quality Indicator (CQI) information and Precoding Matrix Indicator (PMI) information. The CSI informs a NodeB of DL channel conditions that a UE experiences, and accordingly, the NodeB may select appropriate parameters, such as a transmission power, a Modulation and Coding Scheme (MCS), and any other similar and/or suitable parameters, for a PDSCH or PDCCH transmission to the UE and may ensure a desired BLock Error Rate (BLER) for transmitting respective data information or DCI. CQI provides a measure of a Signal to Interference and Noise Ratio (SINR) over sub-bands or over an entire operating DL BandWidth (BW), and the CQI may be provided as information indicating a highest MCS for which a BLER target for a data Transport Block Size (TBS) transmitted to the UE may be achieved. The PMI informs a NodeB how to combine a signal that is to be transmitted from multiple NodeB antennas to a UE in accordance with a Multiple-Input Multiple-Output (MIMO) method.

A UE measures CSI based on a DL Reference Signal (RS) transmitted from a NodeB. Different CSI processes may be associated with different CSI measurements that may be respectively obtained from different RSs or from a same RS at different parts of a DL BW. The CSI may be transmitted in a PUCCH or in a PUSCH. The CSI transmission in a PUCCH may be semi-statically configured by a NodeB so as to occur periodically, i.e., the CSI transmission in the PUCCH is a periodic CSI, and may support only small CSI payloads, such as CSI payloads having up to about 10 information bits, in order to avoid excessive overhead. The CSI in a PUSCH may be dynamically triggered by a NodeB, i.e., the CSI transmission in PUSCH is an aperiodic CSI, through a "CSI request" field in a DCI format conveyed by a PDCCH scheduling the PUSCH transmission and it may support large CSI payloads in order to provide the NodeB with detailed information for PDSCH scheduling.

Figure 1:
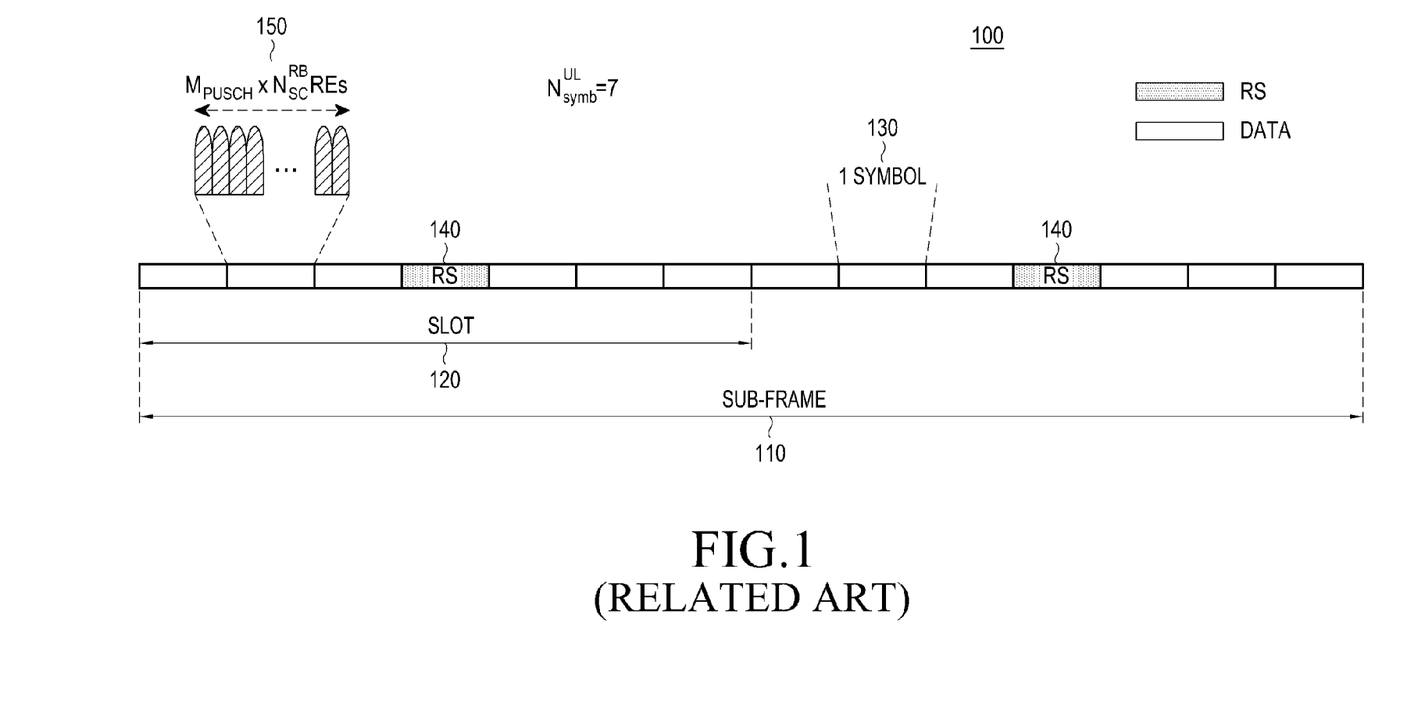
FIG. 1 is a diagram illustrating a Physical UL Shared CHannel (PUSCH) transmission structure in an Uplink (UL) Transmission Time Interval (TTI) according to the related art.

FIG. 1 illustrates a PUSCH transmission structure in an UL TTI according to the related art.

Referring to FIG. 1, a UL TTI 100 may include one subframe 110, which includes two slots 120. Each slot 120 includes a number, $N_{symb}^{UL}$, of symbols 130 for transmitting a UL RS transmission 140, data information, UCI and any other similar and/or suitable data or information. As shown in FIG. 1, each slot 120 includes 7 symbols 130 such that $N_{symb}^{UL}=7$. The UL RS transmission 140 provides channel estimation and enables coherent demodulation of data information or UCI. The UL RS may be transmitted using a Zadoff-Zhu (ZC) sequence that is assigned a Cyclic Shift (CS) and the two UL RSs in a subframe may be further modulated by an Orthogonal Covering Code (OCC) having a value of {1 1} or {1 −1}. A PUSCH transmission BW includes frequency resource units which will be referred to as Resource Blocks (RBs). Each RB includes $N_{sc}^{RB}$ sub-carriers, or Resource Elements (REs), and a UE may be allocated $M_{PUSCH}$ RBs 150 for a PUSCH transmission such that a total of $M_{sc}^{PUSCH}=M_{PUSCH} \cdot N_{sc}^{RB}$ REs.

Figure 2:
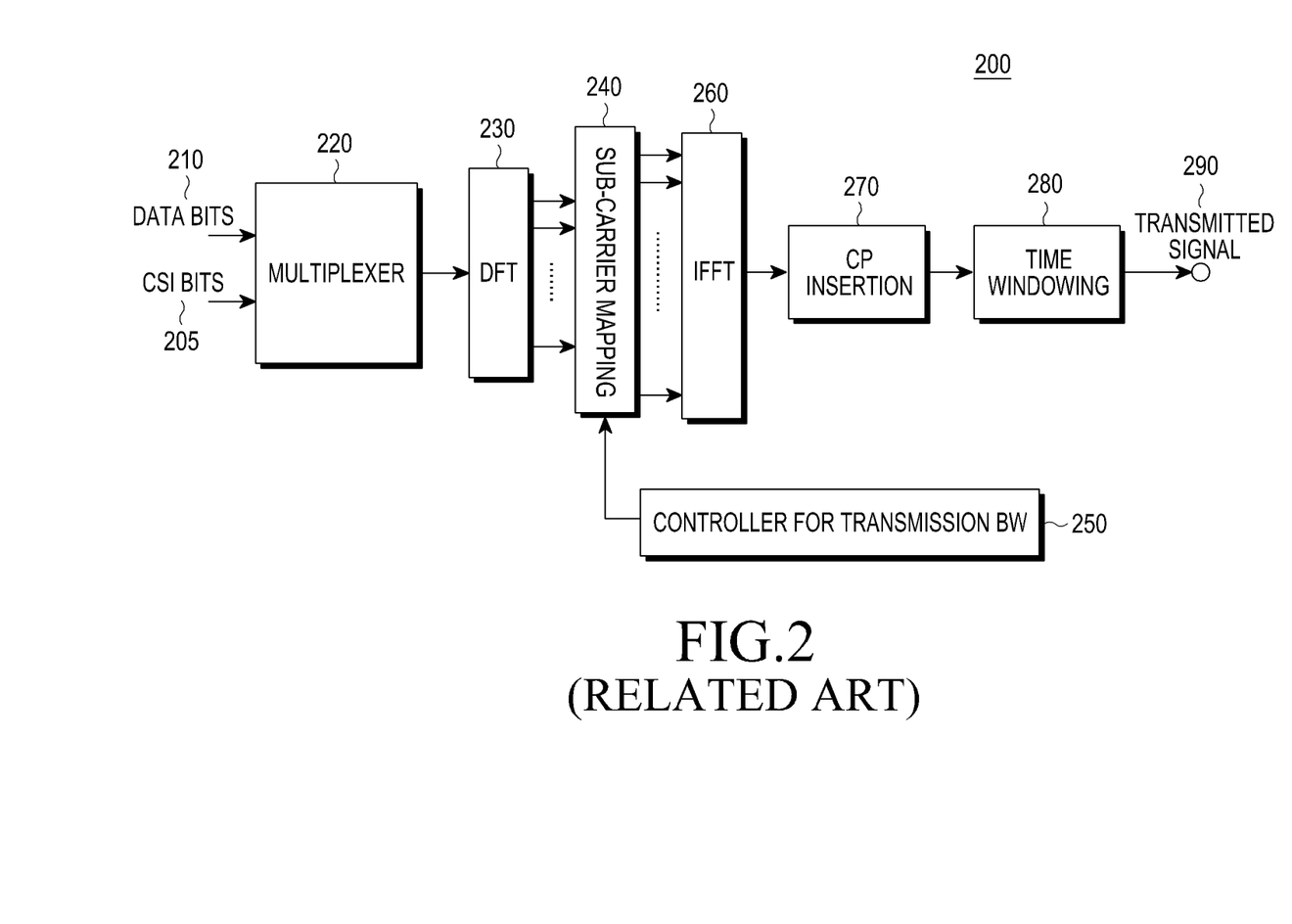
FIG. 2 is a block diagram illustrating a User Equipment (UE) transmitter for a PUSCH according to the related art.

FIG. 2 illustrates a UE transmitter block diagram for a PUSCH according to the related art.

Referring to FIG. 2, in the UE transmitter 200, coded CSI bits 205 and coded data bits 210 are multiplexed by multiplexer 220. A Discrete Fourier Transform (DFT) of combined data bits and CSI bits is then obtained by a DFT unit 230. Next, REs are provided to a sub-carrier mapping unit 240 so that REs corresponding to an assigned transmission BW are selected by a controller for transmission BW 250, and then Inverse Fast Fourier Transform (IFFT) is performed by an IFFT unit 260. Next, a Cyclic Prefix (CP) is inserted by a CP insertion unit 270 and filtering is performed by a time windowing unit 280 in order to generate a transmitted signal 290. An encoding process for data bits or CSI bits and a modulation process for all transmitted bits are omitted for brevity.

Figure 3:
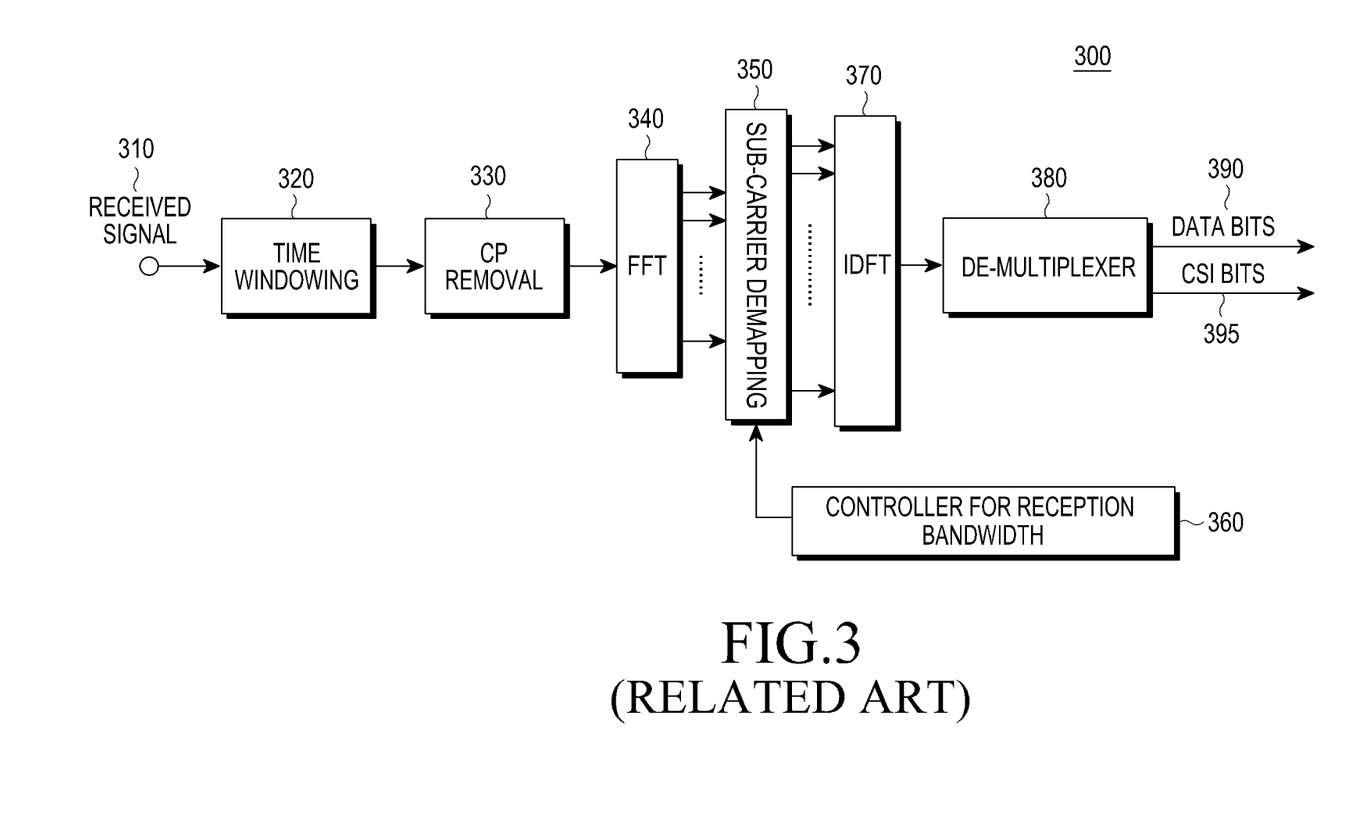
FIG. 3 is a block diagram illustrating a NodeB receiver block diagram for a PUSCH according to the related art.

FIG. 3 illustrates a NodeB receiver block diagram for a PUSCH according to the related art.

Referring to FIG. 3, the NodeB receiver 300 receives a signal 310 and filters the received signal 310 using a time windowing unit 320. Next, a CP removal unit 330 removes a CP, and then a Fast Fourier Transform (FFT) unit 340 applies an FFT and provides REs to a subcarrier demapping unit 350, and a controller for reception bandwidth 360 selects the REs used by a transmitter. Next, an Inverse DFT (IDFT) unit 370 applies an IDFT, and a de-multiplexer 380 de-multiplexes a signal received from the IDFT unit 370 in order to generate data bits 390 and CSI bits 395.

Information in an aperiodic CSI report may be determined by a respective aperiodic CSI mode of a UE configured by a NodeB through higher layer signaling. For example, an aperiodic CSI mode may be based on measurements for conveying CQI and PMI for multiple sub-bands, and such a mode may be referred to as mode 2-2, or may be based on measurements for conveying CQI for multiple sub-bands and no PMI, which may be referred to as mode 3-1. An aperiodic CSI mode may be associated with a PDSCH Transmission Mode (TM) of a UE configured by a NodeB through higher layer signaling. For example, for a PDSCH TM of transmission diversity, mode 3-1 may be used, and for a PDSCH TM of spatial multiplexing, mode 2-2 may be used. Similarly, information in a periodic CSI report may be determined by a respective periodic CSI mode of a UE as configured by higher layer signaling and is also associated with a PDSCH TM. For example, for a PDSCH TM using transmission diversity, a periodic CSI report may be based on measurements for conveying wideband CQI, which may be referred to as mode 1-0, or be based on measurements for conveying sub-band CQI and no PMI, which may be referred to as mode 2-0. Additionally, for a PDSCH TM using spatial multiplexing, a periodic CSI report may convey wideband CQI, which may be referred to as mode 1-1, or may convey sub-band CQI and a single PMI, which may be referred to as mode 2-1.

In order to increase transmission data rates to a UE, multiple DL cells may be aggregated and multiple PDSCHs may be respectively transmitted to the UE, and such a process may be referred to as DL Carrier Aggregation (CA). PDSCH transmission parameters in each DL cell may be independent so as to maximize a respective spectral efficiency. DL cells that may convey PDSCHs to a UE in a subframe may be referred to as active DL cells. In order to enable independent link adaptation for each active DL cell, a UE should provide a respective CSI. Similar principles apply for DL Coordinated Multiple Point (COMP) transmission to a UE, wherein multiple Transmission Points (TPs) NodeBs transmit the same data information to a UE.

In a case where a UE transmits a PUCCH using only a single UL cell, wherein the UE may do such because it may not have a UL CA capability or because channel conditions, such as a path-loss, in one UL cell may be more favorable or because of system design simplicity, then transmission of multiple periodic CSI reports for respective multiple DL cells may be problematic if such a transmission relies on a PUCCH that may only have enough payload capacity to reliably convey a periodic CSI for a single DL cell.

The above limitation may be circumvented by a UE transmitting a periodic CSI report for each active DL cell in a different subframe using a PUCCH format conveying a periodic CSI report for a single cell. However, this Time Division Multiplexing (TDM) of periodic CSI reports may need a reporting periodicity that is too large which may lead to spectral efficiency degradation of respective PDSCH transmissions as a DL channel used by a UE may change between successive periodic CSI reports. For example, in a TDD system, a number of UL subframes over 10 total subframes may be small, particularly in order to support high DL data rates.

Alternatively, in order to circumvent the above limitation, an aperiodic CSI may be relied upon. For example, as a UE should convey Transmission Control Protocol (TCP) Acknowledgements (ACKs) in a PUSCH in response to reception of data packets, a NodeB may instruct the UE to also multiplex aperiodic CSI in that PUSCH. This can be done by the inclusion of a 2-bit CSI request field in a DCI format that is for scheduling a PUSCH. An example of the 2-bit CSI request is shown in Table 1. A "00" value indicates no aperiodic CSI multiplexing in a PUSCH, and a "01" value indicates that a UE should multiplex aperiodic CSI only for a DL cell that is linked or paired to an UL cell of the PUSCH transmission of a serving DL cell. Furthermore, a value of "10" or "11" indicates that a UE should multiplex aperiodic CSI for a first set or for a second set, respectively, of DL active cells where the UE is configured the cells in the first set or in the second set by higher layer signaling such as Radio Resource Control (RRC) signaling.

TABLE 1

Aperiodic CSI Report
as a Function of CSI request field value.

| Value of CSI request field | Description |
| --- | --- |
| '00' | No aperiodic CSI report |
| '01' | Aperiodic CSI report for DL cell linked to UL cell (serving cell) |
| '10' | Aperiodic CSI report for a 1st set of cells configured by higher layers |
| '11' | Aperiodic CSI report for a 2nd set of cells configured by higher layers |

While the approach using the aperiodic CSI may support aperiodic CSI reports for multiple DL cells, it is not an ideal solution for providing timely periodic CSI reports. In general, it may not be possible to support an aperiodic CSI reporting for a CSI measurement process selected from multiple CSI measurement processes as aperiodic CSI reporting is uniquely associated with a predetermined CSI measurement process. For example, there is currently no capability for a CSI request field to indicate aperiodic CSI reporting selected between a conventional aperiodic CSI measurement and a conventional periodic CSI measurement or between a measurement from a first DL RS and a measurement from a second DL RS.

Therefore, there is a need to enable aperiodic CSI reporting for a CSI process selected among multiple CSI processes. Additionally, there is a need to indicate a CSI process, from among multiple CSI processes, to a UE for aperiodic CSI reporting. Furthermore, there is a need to enhance a DCI format capability so as to indicate one or more CSI processes, from among multiple CSI processes, for aperiodic CSI reporting.

The above information is presented as background information only to assist with an understanding of the present disclosure. No determination has been made, and no assertion is made, as to whether any of the above might be applicable as prior art with regard to the present invention.

SUMMARY OF THE INVENTION

Accordingly, aspects of the present invention have been designed to solve at least the aforementioned limitations and problems in the prior art and the present invention provides methods and apparatus for multiplexing Channel State Information (CSI) for one or more sets of CSI processes, from among a plurality of sets of CSI processes, in a Physical Uplink Shared CHannel (PUSCH) transmitted by a User Equipment (UE). A mapping of a CSI request field in a Downlink Control Information (DCI) format is provided for indicating one or more sets of CSI processes, from among the plurality of sets of CSI processes configured for the UE by a base station. A modification to an existing DCI format so as to increase a number of bits for the CSI request field to provide flexibility in indicating a set of CSI processes for CSI reporting is also provided.

In accordance with an aspect of the present invention, a method for transmitting Channel State Information (CSI) in a communication system, the CSI having a reporting mode and being transmitted from a User Equipment (UE) over a Physical Uplink (UL) Shared CHannel (PUSCH) transmission in an UL cell, the UL cell being associated with a Downlink (DL) cell, the PUSCH transmission being in response to a receiving, by the UE, of a Downlink Control Information (DCI) format that includes a CSI request field indicating CSI transmission, the CSI corresponding to one of CSI process sets respectively associated with measurements of respective reference signals is provided. The method includes obtaining, from the CSI request field, an indication of a CSI process set for a CSI transmission, and transmitting the CSI for the CSI process set indicated by the CSI request field, wherein the CSI request field includes 2 bits of a first CSI process set having a first set of interpretations, wherein, for the 2 bits of the first CSI process set, the first set of interpretations are a 2 bit value of '00' indicates no CSI transmission, a 2 bit value of '01' indicates CSI transmission for a CSI process set corresponding to the DL cell, a 2 bit value of '10' indicates CSI transmission for a first CSI process set, and a 2 bit value of '11' indicates CSI transmission for a second CSI process set.

In accordance with another aspect of the present invention, a method for transmitting Channel State Information (CSI) in a communication system, the CSI having a reporting mode and being transmitted from a User Equipment (UE) over a Physical Uplink Shared CHannel (PUSCH) transmission, the PUSCH transmission being in response to a reception by the UE of a Downlink Control Information (DCI) format that includes a CSI request field indicating CSI transmission is provided. The method includes representing the CSI request field with a first number of bits if the CSI is for a single CSI process associated with measurement of a reference signal, and representing the CSI request field with a second number of bits if the CSI is for at least one CSI process set selected from among a plurality of CSI process sets, wherein each CSI process set is associated with measurements of respective reference signals, and wherein the selection of the at least one CSI process set is based on the CSI request field value and the second number of bits is larger than the first number of bits.

In accordance with another aspect of the present invention, a User Equipment (UE) apparatus for transmitting Channel State Information (CSI), the CSI having a reporting mode, over a Physical Uplink (UL) Shared CHannel (PUSCH) in an UL cell, the UL cell being associated with a Downlink (DL) cell, the CSI corresponding to a CSI process set associated with measurements of respective reference signals is provided. The apparatus includes a receiver for receiving a Downlink Control Information (DCI) format for scheduling the PUSCH transmission, the DCI format including a CSI request field indicating a CSI transmission for a CSI process set, and a transmitter for transmitting the CSI transmission for the CSI process set indicated by the CSI request field, wherein the CSI request field includes 2 bits having a first set of interpretations, wherein, the first set of interpretations for the 2 bits are a value of '00' indicates no CSI transmission, a value of '01' indicates the CSI transmission for a CSI process set corresponding to the DL cell, a value of '10' indicates the CSI transmission for a first CSI process set and a value of '11' indicates the CSI transmission for a second CSI process set.

In accordance with another aspect of the present invention, A User Equipment (UE) apparatus for transmitting Channel State Information (CSI), the CSI having a reporting mode and being transmitted over a Physical Uplink Shared CHannel (PUSCH). The apparatus includes a receiver for receiving a Downlink Control Information (DCI) format for scheduling the PUSCH transmission, the DCI format including a CSI request field indicating a CSI transmission for a CSI process set, and a transmitter for transmitting the CSI transmission in the PUSCH, wherein the CSI request field is represented by a first number of bits if the CSI is for a single CSI process associated with measurement of a reference signal and the CSI request field is represented by a second number of bits if the CSI is for at least one CSI process set selected from among a plurality of CSI process sets, wherein each CSI process set is associated with measurement of respective reference signals, and wherein the selection of the at least one CSI process set is based on the CSI request field value and the second number of bits is larger than the first number of bits.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The present invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

According to the below described exemplary embodiments, a NodeB and a User Equipment (UE) may support multiple aperiodic Channel State Information (CSI) processes associated with different measurements. Unlike related-art operations, where a UE is configured with a single aperiodic CSI reporting process for each active Downlink (DL) cell, the below described exemplary embodiments proved a UE that is configured with multiple aperiodic CSI reporting processes for each active DL cell. As previously mentioned, a first aperiodic CSI process may be associated with measurement associated with conventional aperiodic CSI reporting and a second aperiodic CSI process may be associated with a measurement associated with related-art periodic CSI reporting. Alternatively, a first aperiodic CSI process may be associated with measurement associated with a first DL Reference Signal (RS) and a second aperiodic CSI process may be associated with a measurement associated with a second DL RS. The multiple aperiodic CSI process may be used by a NodeB to support DL Carrier Aggregation (CA) or DL Coordinated Multiple Point (CoMP).

Figure 4:
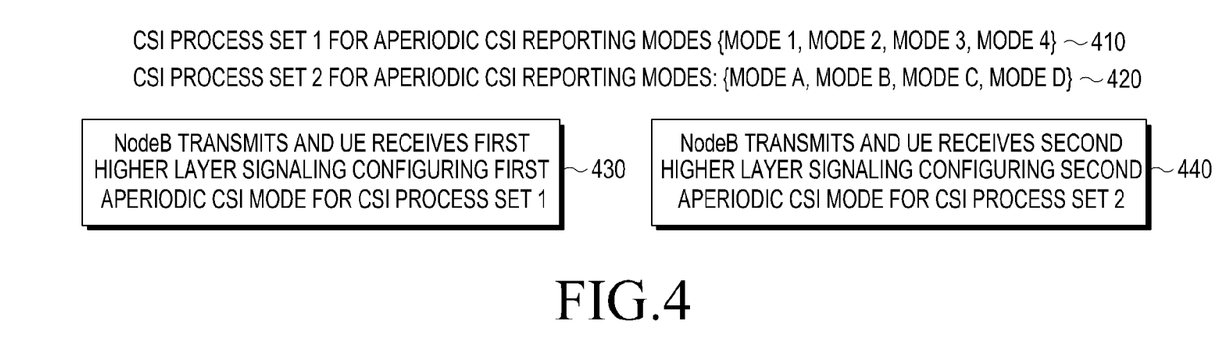
FIG. 4 is a diagram illustrating a configuration by higher layer signaling of two aperiodic Channel State Information (CSI) reporting modes for respective CSI processes according to an exemplary embodiment of the preset invention.

FIG. 4 illustrates a configuration by higher layer signaling from a NodeB to a UE of two aperiodic CSI reporting modes for respective CSI processes according to an exemplary embodiment of the preset invention.

Referring to FIG. 4, a UE may know, from the specification of a communication system, that a first aperiodic CSI may be reported so that the UE is informed of a mode for CSI process Set 1 410 while a second aperiodic CSI may be reported with a mode for CSI process Set 2 420. For each active DL cell, the UE receives a first higher layer signaling for configuring a first aperiodic CSI reporting mode for CSI process Set 1 430. The UE also receives a second higher layer signaling for configuring a second aperiodic CSI reporting mode for CSI process Set 2 440. According to the present exemplary embodiment, instead of having explicit higher layer signaling for the second aperiodic CSI reporting mode for CSI process Set 2, this mode may be linked to the first aperiodic CSI reporting mode for CSI process Set 1 in a predetermined manner. In this case, only a single higher layer signaling, for configuring the mode of the first aperiodic CSI reporting mode for CSI process Set 1, may be provided to the UE. For example, if a first aperiodic CSI reporting mode for CSI process Set 1 corresponds to a Physical DL Shared CHannel (PDSCH) transmission using spatial multiplexing, a respective first aperiodic CSI mode for CSI process Set 2 may also be implicitly selected to correspond to a same PDSCH Transmission Mode (TM) without requiring additional higher layer signaling.

In accordance with another exemplary embodiment, a NodeB may dynamically indicate, to a UE, whether it should report, using a Physical Uplink (UL) Shared CHannel (PUSCH), an aperiodic CSI for an active DL cell with a reporting mode for CSI process Set 1 or with a reporting mode for CSI process Set 2.

For example, in a first case for a UE configured to report an aperiodic CSI with either a reporting mode for CSI process Set 1 or with a reporting mode for CSI process Set 2, the values of a CSI request field in Table 1 are reinterpreted so as to be those shown in Table 2.

TABLE 2

Aperiodic CSI report from CSI process Set 1 or from CSI process Set 2

| CSI request field | Description |
| --- | --- |
| '00' | No aperiodic CSI report |
| '01' | Aperiodic CSI report for CSI process Set for DL cell linked to UL cell (serving cell) |
| '10' | Aperiodic CSI report for CSI process Set 1 for a 1st set of cells configured by higher layers |
| '11' | Aperiodic CSI report for CSI process Set 2 for a 2nd set of cells configured by higher layers |

The first three entries in Table 2 may be the same as those in Table 1, but the last entry, that for '11', is modified in order to support an aperiodic CSI reporting mode for CSI process Set 2. The DL active cells for which an aperiodic CSI reporting mode for CSI process Set 2 is reported may be different than the DL active cells having a mode for CSI process Set 1. For example, the DL active cell linked to the UL cell of Physical UL Control CHannel (PUCCH) transmissions from a UE may not be included in the $2^{nd}$ set of cells having aperiodic CSI for CSI process Set 2. This is because a periodic CSI report for that cell is assumed to be prioritized by a UE over a periodic CSI report from any other active cell and the respective periodic CSI report can be typically obtained through a PUCCH.

Alternatively, as a modification of the first case, an interpretation of a CSI request field is maintained as in Table 1 so as to correspond to aperiodic CSI reports for CSI process Set 1, but a UE may also include aperiodic CSI reports for CSI process Set 2 for active cells that are not included in a set of cells indicated by a CSI request field, however, an exception may be made for a case when the value of a CSI request field is '01' and aperiodic CSI for CSI process Set 1 is requested only for the serving DL cell. For example, for a UE having three DL active cells and which is also configured to report aperiodic CSI for CSI process Set 2, if a CSI request field indicates that the UE, for CSI process Set 1, should include an aperiodic CSI report for a first and a third DL active cells in an associated PUSCH, then the UE also includes an aperiodic CSI report for CSI process Set 2 for a second DL active cell.

Figure 5:
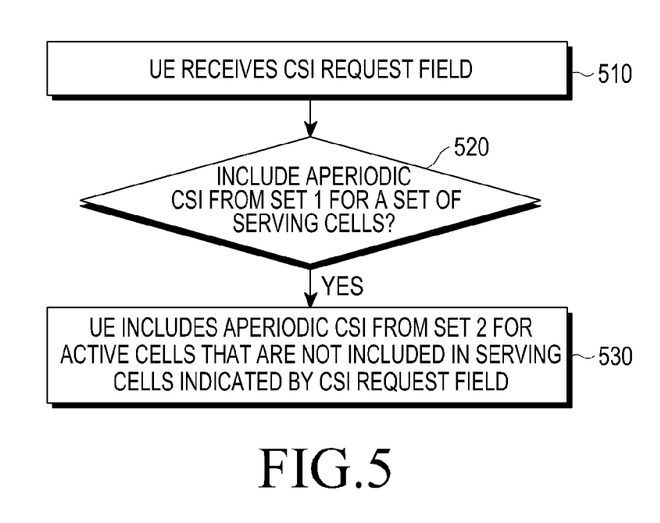
FIG. 5 is a diagram illustrating an aperiodic CSI report for CSI process Set 1 and an aperiodic CSI report for CSI process Set 2 for a conventional interpretation of a CSI request field according to an exemplary embodiment of the preset invention.

FIG. 5 illustrates an aperiodic CSI report for CSI process Set 1 and an aperiodic CSI report for CSI process Set 2 for a related-art interpretation of a CSI request field according to an exemplary embodiment of the preset invention.

Referring to FIG. 5, in step 510, a UE receives a CSI request field that is included in a DL Control Information (DCI) format that is conveyed by a Physical DL Control Channel (PDCCH) and the UE schedules a PUSCH transmission. Next, in step 520, it is determined if a value of a CSI request field in the DCI format indicates that the UE shall include aperiodic CSI reports from CSI process Set 1 for a set of serving cells. If the aperiodic CSI reports from CSI process Set 1 are included, as determined in step 520, then, in step 530, the UE also includes aperiodic CSI reports from CSI process Set 2 for the set of active cells included in the set of active cells but not indicated by the value of the CSI request field.

An advantage of the first case is that it does not increase a number of bits allocated to a CSI request field in a DCI format and therefore does not increase a respective overhead in a PDCCH. However, in the first case, flexibility for indicating aperiodic CSI reports may be restricted, thereby restricting the functionality of such reports. Moreover, compared to the related-art functionality in Table 1, a functional flexibility for the CSI request field in Table 2 may be reduced by a factor of approximately 2 with respect to selecting active cells for respective aperiodic CSI reports either from CSI process Set 1 or from CSI process Set 2.

In a second case, for a UE configured to use a PUSCH to report aperiodic CSI, with either a reporting mode for CSI process Set 1 or a reporting mode for CSI process Set 2, a CSI request field may include additional bits compared to a related-art CSI request field (see Table 1) and the CSI request field including additional bit may have a structure as shown in Table 3.

TABLE 3

Enhanced Aperiodic CSI report
from CSI process Set 1 or from CSI process Set 2.

| CSI request field | Description |
| --- | --- |
| '000' | No aperiodic CSI report |
| '001' | Aperiodic CSI report for CSI process for cell associated with PDCCH (serving cell) |
| '010' | Aperiodic CSI report for CSI process Set 1 for a 1st set of cells configured by higher layers |
| '011' | Aperiodic CSI report for CSI process Set 1 for a 2nd set of cells configured by higher layers |
| '100' | Aperiodic CSI report for CSI process Set 2 for a 3rd set of cells configured by higher layers |
| '101' | Aperiodic CSI report for CSI process Set 2 for a 4th set of cells configured by higher layers |
| '110' | Aperiodic CSI report for CSI process Set 1 for a 5th set of cells configured by higher layers and aperiodic CSI report for CSI process Set 2 for a 6th set of cells configured by higher layers |
| '111' | Aperiodic CSI report for CSI process Set 1 for a 7th set of cells configured by higher layers and aperiodic CSI report for CSI process Set 2 for a 8th set of cells configured by higher layers |

Increasing a size of a CSI request field from 2 bits, which is the size of the CSI request field in Table 1 and Table 2, to a size of 3 bits, as shown in Table 3, may increase a flexibility for indicating DL active cells for which an aperiodic CSI report with a mode from CSI process Set 1 or an aperiodic CSI report with a mode from CSI process Set 2 is to be reported in a PUSCH. Combinations of DL active cells with aperiodic CSI reports from Set 1 and DL active cells with aperiodic CSI reports from Set 2 may also be supported, as in the example of Table 3 with CSI request field values of '110' and '111'.

An increased flexibility for aperiodic CSI reporting is associated with an increased size of a CSI request field. However, an explicit increase in size of a CSI request field may be avoided by implicitly increasing the size using a bit from another field in a DCI format that is conveyed by a PDCCH scheduling a PUSCH where an aperiodic CSI is to be multiplexed if the CSI request field indicates such multiplexing. For example, a DCI format may also include a 3-bit field indicating the CS and OCC for an UL RS in the PUSCH. In a case having a 2-bit CSI request field that indicates that a UE shall multiplex aperiodic CSI in a PUSCH, 1 bit from the CS and OCC field may be used to supplement the CSI request field, thereby using 3-bits to convey the CSI request field where the '000' and '001' states are same as the '00' state in case of a 2-bit CSI request field and the remaining states may be as indicated in Table 3.

Figure 6:
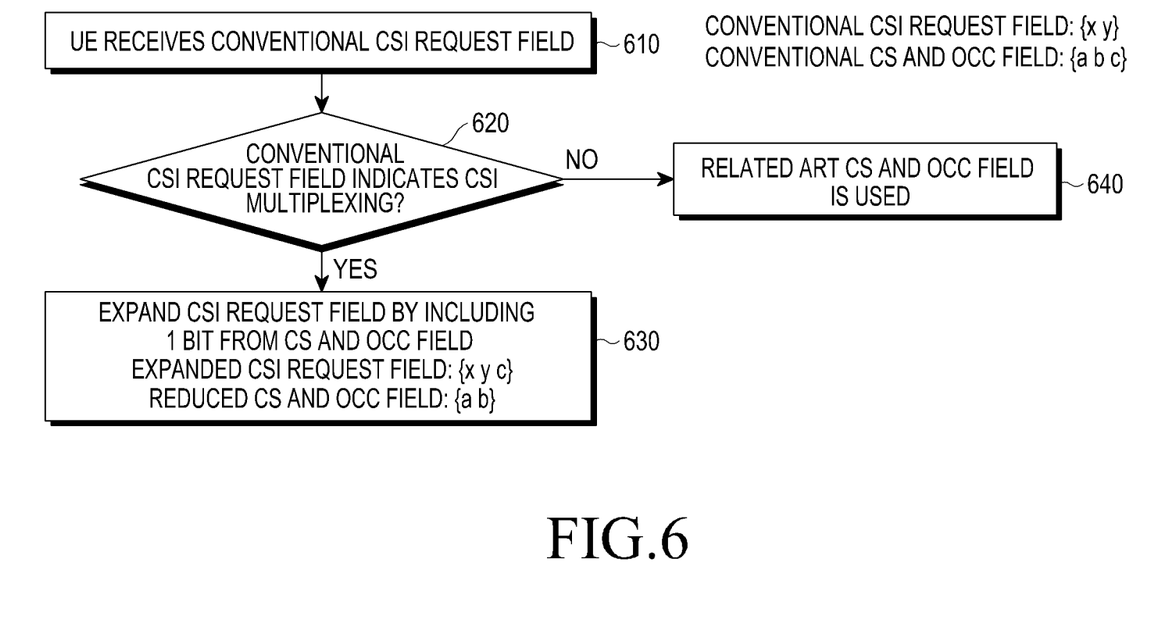
FIG. 6 is a diagram illustrating an implicit expansion of a CSI request field using a bit from a Cyclic Shift (CS) and Orthogonal Covering Code (OCC) field according to an exemplary embodiment of the preset invention.

FIG. 6 illustrates an implicit expansion of a CSI request field using a bit from a CS and OCC field according to an exemplary embodiment of the preset invention.

Referring to FIG. 6, in step 610, a UE receives a related-art CSI request field in a DCI format. Then, in step 620, it is determined if the related-art CSI request field indicates CSI multiplexing in an associated PUSCH, i.e., the value of the CSI request is not '00'. If the value of the CSI request is not '00', then the UE considers one bit from a CS and OCC field to be part of the CSI request field and, thus, expands the CSI request field by including 1 bit from the CS and OCC field in step 630. Otherwise, the UE applies the related-art interpretation of the CSI request field, and uses the related-art CS and OCC field in step 640. A UE considers the bits from the related-art CSI request field and the additional bit from the CS and OCC field to form an expanded CSI request field for which the states can be interpreted as those shown in Table 3, with the exception that the '001' state is not applicable in a case where the additional bit is placed last in the expanded CSI request field.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for communicating in a wireless communication system, the method comprising:
   receiving, by a user equipment (UE), configuration information for a plurality of channel state information (CSI) processes;
   receiving, by the UE, downlink control information (DCI) including an indicator for a CSI report;
   generating, by the UE, CSI based on the indicator and the configuration information; and
   transmitting, by the UE, the generated CSI on a physical uplink shared channel (PUSCH),
   wherein the plurality of CSI processes comprises a first CSI process set and a second CSI process set, and
   wherein the first CSI process set is associated with a first measurement associated with a first reference signal received for the first CSI process set from a serving cell and the second CSI process set is associated with a second measurement associated with a second reference signal received for the second CSI process set from the serving cell.

2. The method of claim 1, wherein the generating of the CSI comprises:
   selecting a CSI process from among the plurality of CSI processes determined based on the configuration information by the indicator; and
   generating, by the UE, the CSI based on the selected CSI process.

3. The method of claim 2, wherein the first CSI process set and the second CSI process set are configured by high layer signaling.

4. The method of claim 3, wherein the indicator is configured by 2 bits.

5. The method of claim 4, wherein, the indicator comprises one of:
   '00', indicating no aperiodic CSI report,
   '01', indicating an aperiodic CSI report for a CSI process set corresponding to a downlink (DL) cell,
   '10', indicating an aperiodic CSI report for the first CSI process set, and
   '11', indicating an aperiodic CSI report for the second CSI process set.

6. A user equipment (UE) apparatus, the apparatus comprising:
a receiver configured to:
receive configuration information for a plurality of channel state information (CSI) processes, and
receive downlink control information (DCI) including an indicator for a CSI report; and
a transmitter configured to:
generate CSI based on the indicator and the configuration information, and
transmit the generated CSI on a physical uplink shared channel (PUSCH),
wherein the plurality of CSI processes comprises a first CSI process set and a second CSI process set, and
wherein the first CSI process set is associated with a first measurement associated with a first reference signal received for the first CSI process set from a serving cell and the second CSI process set is associated with a second measurement associated with a second reference signal received for the second CSI process set from the serving cell.

7. The apparatus of claim 6, wherein the transmitter is further configured to:
select a CSI process from among the plurality of CSI processes based on the configuration information by the indicator, and
generate the CSI based on the selected CSI process.

8. The apparatus of claim 7, wherein the first CSI process set and the second CSI process set are configured by high layer signaling.

9. The apparatus of claim 8, wherein the indicator is configured by 2 bits.

10. The apparatus of claim 9, wherein the indicator comprises one of:
'00', indicating no aperiodic CSI report,
'01', indicating an aperiodic CSI report for a CSI process set corresponding to a downlink (DL) cell,
'10', indicating an aperiodic CSI report for the first CSI process set, and
'11', indicating an aperiodic CSI report for the second CSI process set.

11. A method for communication in a wireless communication system, the method comprising:
transmitting configuration information for a plurality of channel state information (CSI) processes;
transmitting downlink control information (DCI) including an indicator for a CSI report; and
receiving, from a user equipment (UE), CSI generated based on the indicator and the configuration information on a physical uplink shared channel (PUSCH),
wherein the plurality of CSI processes comprises a first CSI process set and a second CSI process set, and
wherein the first CSI process set is associated with a first measurement associated with a first reference signal transmitted for the first CSI process set from a serving cell and the second CSI process set is associated with a second measurement associated with a second reference signal transmitted for the second CSI process set from the serving cell.

12. The method of claim 11, wherein the first CSI process set and the second CSI process set are configured by high layer signaling.

13. The method of claim 12, wherein the CSI request field is configured by 2 bits.

14. The method of claim 13, wherein the CSI request field comprises one of:
'00', indicating no aperiodic CSI report,
'01', indicating an aperiodic CSI report for a CSI process set corresponding to a downlink (DL) cell,
'10', indicating an aperiodic CSI report for the first CSI process set, and
'11', indicating an aperiodic CSI report for the second CSI process set.

15. A base station, the base station comprising:
a transmitter configured to:
transmit configuration information for a plurality of channel state information (CSI) processes, and
transmit downlink control information (DCI) including an indicator for a CSI report; and
a receiver configured to receive, from a user equipment (UE), CSI generated based on the indicator and the configuration information on a physical uplink shared channel (PUSCH),
wherein the plurality of CSI processes comprises a first CSI process set and a second CSI process set, and
wherein the first CSI process set is associated with a first measurement associated with a first reference signal transmitted for the first CSI process set from a serving cell and the second CSI process set is associated with a second measurement associated with a second reference signal transmitted for the second CSI process set from the serving cell.

16. The base station of claim 15, wherein the first CSI process set and the second CSI process set are configured by high layer signaling.

17. The base station of claim 16, wherein the CSI request field is configured by 2 bits.

18. The base station of claim 17, wherein the CSI request field comprises one of:
'00', indicating no aperiodic CSI report,
'01', indicating an aperiodic CSI report for a CSI process set corresponding to a downlink (DL) cell,
'10', indicating an aperiodic CSI report for the first CSI process set, and
'11', indicating an aperiodic CSI report for the second CSI process set.

* * * * *